UNITED STATES PATENT OFFICE.

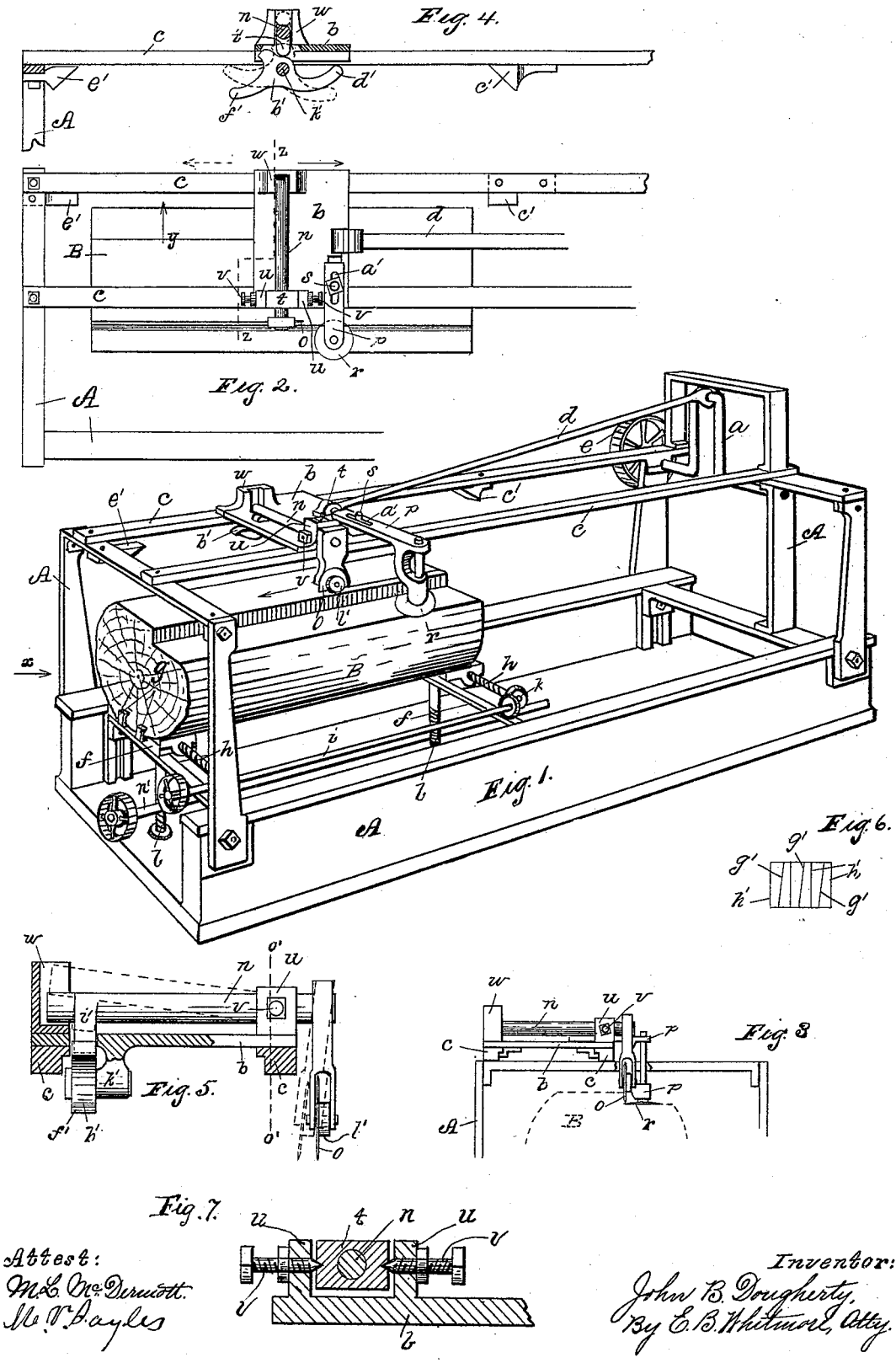

JOHN B. DOUGHERTY, OF WYOMING, ASSIGNOR TO ALFRED WADSWORTH, OF WARSAW, NEW YORK.

HOOP-MACHINE.

SPECIFICATION forming part of Letters Patent No. 420,902, dated February 4, 1890.

Application filed May 9, 1889. Serial No. 310,211. (No model.)

*To all whom it may concern:*

Be it known that I, JOHN B. DOUGHERTY, of Wyoming, in the county of Wyoming and State of New York, have invented a new and useful Improvement in Hoop-Machines, which improvement is fully set forth in the following specification, and shown in the accompanying drawings.

My invention is a machine for cutting hoops, in which two rolling cutters are employed to cut the hoop from the log, the essential part of the invention being the arrangement by which one of the rolling cutters is tilted at each operation of the machine for the purpose of making the hoop thinner at one edge than at the other. The planes of the two rolling cutters are at right angles to each other, one serving to cut into the log to the depth of the width of the hoop and the other serving to cut into the wood to the depth of the thickness of the hoop. The cutters are reciprocated along the log from end to end by means of a sliding head, cutting off a hoop each time they pass over the log.

Referring to the drawings, Figure 1 is a perspective view of the machine; Fig. 2, a plan of the parts near the log; Fig. 3, an end elevation of some of the parts seen as indicated by arrow $x$ in Fig. 1; Fig. 4, a sectional side elevation of a part of the frame, better showing the tilting mechanism. Fig. 5, drawn to a larger scale, better shows the form of the vertical cutter and other parts, the section being taken on the dotted line $z\ z$ in Fig. 2. Fig. 6 is an end view of a series of hoops, showing their tapered form; and Fig. 7, a section through the pivot-screws $v\ v$ on dotted line $o'$, Fig. 5.

Referring to the parts shown in the drawings, A is the frame of the machine; $a$, a crank-shaft held at one end of the frame; $b$, a reciprocating cross-head; $c$, parallel ways or guides secured to the frame, along which the cross-head travels, and $d$ a connecting-rod for the crank and cross-head. The crank-shaft is driven by some ordinary means, as a belt upon the pulley $e$ rigid with the shaft.

B represents the log from which the hoops are cut.

The means I employ for holding and shifting the log is common in machines of this character and does not constitute a part of my invention. Briefly, as shown, the log rests upon suitable cross-supports $f$, held in place by means of dogs $g$, and is moved laterally by means of horizontal screws $h$, operated by a shaft $i$, with bevel or miter connecting-gears $k$. Any other simple or well-known means may be substituted for these parts. The log is raised by vertical screws $l\ l$ and shaft $n'$ beneath it, or equivalent mechanical means involving no invention. Upon the reciprocating head $b$ is mounted a horizontal tilting shaft $n$, carrying a vertical rolling cutter $o$.

$p$ is a horizontal bar or support carrying a horizontal rolling cutter $r$, the bar being adjustably secured to the head by a tap-screw $s$, entering a slot $a'$ in the bar. The tilting shaft $n$ is formed with an enlarged part or head $t$, resting between upright jaws $u$ of the cross-head, the said jaws holding horizontal pointed screws $v$, which enter cavities in the opposite side of the head $t$. These opposing pivotal screws constitute the axis upon which the shaft tilts. The other or free end of the shaft plays in a vertical guide $w$ of the head $b$, a lifter for the free end of the shaft in the form of a cam $b'$, for instance, Figs. 4 and 5, serving to raise or tilt the shaft as the cross-head moves forward against the incline $c'$. This is effected by means of the part $d'$ of the cam sliding down along the incline when the latter is encountered. The cam, being thus thrown to the position shown in dotted lines, raises the free end of the shaft. When the cam is carried back by the crank against the opposing incline $e'$, the part $f'$ of the cam slides downward along the incline, which throws the cam to the position shown in full lines, allowing the end of the shaft to again fall to a horizontal position. The tilting of the shaft slightly inclines the cutter $o$, causing it to cut from the log a hoop thinner at its upper edge than at its lower. This will be understood by observing Fig. 6. The cutter when tilted makes the incline cuts $g'$, while when straight makes vertical cuts $h'$.

A hoop is cut from the log each time the sliding head $b$ passes over it, there being two hoops cut at each revolution of the crank-shaft $a$. The cutter $r$ cuts along the lower edge of the hoop, as shown, severing the latter from the log, and by means of its being horizontally adjustable it may be set so that it and the cutter $o$ will both cut to the same line through the log—that is to say, to the line of the inner lower corner of the hoop. The plane of the cutter $r$ is tangent to the lower edge of the cutter $o$. The cam $b'$ may bear directly against the cylindrical part of the shaft $n$, or the latter may be provided with a downward projection $i'$ to receive the action of the cam. This part $i'$ also constitutes a weight for the free end of the shaft, to cause the latter to drop when the cam is turned from beneath it. The cam is held by a hanger $k'$, extending downward from the under surface of the cross-head.

A different weight from that shown at $i'$ may be employed, if necessary; but much weighting of the shaft is not needed, as the pressure of the log against the lower edge of the vertical cutter tends to keep the shaft down against the cam.

The cutter $o$ is formed with a collar $l'$, which serves as a gage for the depth to which the cutter sinks into the log. This collar rolls along the upper surface of the log when the cutter is acting.

What I claim as my invention is—

1. In a hoop-machine, in combination with a reciprocating cross-head and slides therefor, a non-rotatory tilting shaft provided with a cutter, pivots for said tilting shaft, and guides for the free end of the shaft, substantially as shown and described.

2. In a hoop-machine, in combination with a moving cross-head and slides therefor, a tilting shaft held in bearings on said cross-head, a cutter held by the shaft, a cam to tilt the shaft, and actuators for the cam, substantially as described.

3. The reciprocating head of a hoop-machine and slides therefor, in combination with a shaft held by the head, a vertical cutter for the shaft, a horizontal cutter, and a holder for the same secured adjustably to the head, substantially as and for the purpose set forth.

In witness whereof I have hereunto set my hand, this 2d day of May, 1889, in the presence of two subscribing witnesses.

JNO. B. DOUGHERTY.

Witnesses:
E. B. WHITMORE,
M. L. McDERMOTT.